(12) United States Patent
Liang

(10) Patent No.: US 6,307,667 B1
(45) Date of Patent: Oct. 23, 2001

(54) GAIN-CLAMPED ERBIUM-DOPED FIBER AMPLIFIER WITH PULSED COMPENSATING LASER SIGNAL

(75) Inventor: Anhui Liang, Eatontown, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/453,376

(22) Filed: Dec. 2, 1999

(51) Int. Cl.[7] ....................................... H01S 3/00
(52) U.S. Cl. .............................. 359/337; 359/341
(58) Field of Search ................... 359/341, 337, 359/133, 340, 347, 346, 349; 385/8; 372/6

(56) References Cited

U.S. PATENT DOCUMENTS 5,239,607 * 8/1993 da Silva et al. ................ 385/122
5,872,649 * 2/1999 Byron et al. ................... 359/341
6,008,932 * 12/1999 Lou et al. ....................... 359/337

* cited by examiner

*Primary Examiner*—Mark Hellner

(57) ABSTRACT

A gain-clamped, optical amplifier includes a rare-earth doped fiber and a source of pump energy coupled to the rare-earth doped fiber. The doped fiber serves as a gain medium that is optically pumped by the pump source. A wavelength-selective optical feedback loop is coupled between input and output ports of the rare-earth doped fiber. The feedback loop supports a compensating lasing signal, which is a pulsed signal located at a wavelength different from a signal wavelength.

36 Claims, 4 Drawing Sheets

GAIN-CLAMPED ERBIUM-DOPED FIBER AMPLIFIER WITH PULSED COMPENSATING LASER SIGNAL

FIELD OF THE INVENTION

The present invention relates generally to optical amplifiers, and more particularly to a gain clamped optical amplifier.

BACKGROUND OF THE INVENTION

The availability of high performance optical amplifiers such as erbium-doped fiber amplifiers (EDFA's) has renewed interest in the use of wavelength division multiplexing (WDM) for optical transmission systems. In a WDM transmission system, two or more optical data carrying channels, each defined by a different carrier wavelength, are combined onto a common path for transmission to a remote receiver. The carrier wavelengths are sufficiently separated so that they do not overlap in the frequency domain. The multiplexed channels are demultiplexed at the receiver in the electrical or optical domain. Demultiplexing in the optical domain requires using frequency-selective components such as optical gratings or bandpass filters. Typically, in a long-haul optical fiber system, the set of wavelength channels would be amplified simultaneously in an optical amplifier based repeater.

One class of optical amplifiers are rare-earth doped optical amplifiers, which use rare-earth ions as a gain medium. The ions are doped in the fiber core and pumped optically to provide gain. The silica fiber core serves as the host medium for the ions. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimized. Also, the erbium-doped fiber amplifier is particularly useful because of its ability to amplify multiple wavelength channels without crosstalk penalty.

The gain characteristics of a rare-earth doped optical amplifier depend on the dopants and co-dopants used to make the fiber core, the particular rare-earth ion employed, and the pumping mechanism that is used. Ideally, optical amplifiers should offer a high degree of gain stabilization to reduce power transients or excursions caused by the EDFA cross-saturation effect. Unfortunately, the gain of an optical amplifier may undergo substantial variations while amplifying a signal. For example, when the individual WDM channels of a WDM communication system are randomly turned on and off (such as in adding or dropping a channel) the gain of the EDFA's could undergo undesirable fluctuations due to saturation effects.

To overcome this problem, gain clamped EDFA's have been developed which provide a stabilized gain. In a gain clamped EDFA, the gain of the EDFA is stabilized by spectrally selective optical feedback sufficient to cause it to lase at some predetermined wavelength separated from the waveband within which the amplifier is designed to function. An example of a gain clamped EDFA is disclosed in U.S. Pat. No. 5,872,649. One advantage of such EDFA's is that WDM transmission systems can be upgraded by adding more channels without adjusting the pump power or the gain shape of the EDFA's. Additionally, the use of gain-clamped EDFA's not only simplifies the upgrading process but also ensures that any power transients that arise in the remaining channels are reduced. Similarly, power transients may also arise when an optical fiber is inadvertently cut, and in such cases gain-clamped EDFA's also reduce the power transients.

A consequence of this form of gain control is that the compensating signal generated in the optical feedback loop may at times have a very high power level, thus making it susceptible to nonlinear interactions such as stimulated Brilloun scattering (SBS). This problem is discussed in Yu et al., "Stimulated Brillouin Scattering of the Compensating Signal in All-Optical Link-controlled Amplifier Systems."

Accordingly, it is desirable to provide a gain clamped optical amplifier in which the adverse effects of SBS are reduced.

SUMMARY OF THE INVENTION

The present invention provides a method and apparatus for amplifiying an optical signal in a gain-clamped manner. In order to reduce the adverse affects of SBS, the compensating signal that is generated is a pulsed signal, which has a greater bandwidth, and hence a lower power level at any given wavelength, than an equivalent compensating signal that is provided as a continuous-wave.

In accordance with one aspect of the invention, a gain-clamped, optical amplifier includes a rare-earth doped fiber and a source of pump energy coupled to the rare-earth doped fiber. The doped fiber serves as a gain medium that is optically pumped by the pump source. A wavelength-selective optical feedback loop is coupled between input and output ports of the rare-earth doped fiber. The feedback loop supports a compensating lasing signal, which is a pulsed signal located at a wavelength different from a signal wavelength.

In accordance with another aspect of the invention, the optical feedback loop is arranged in an additive-pulse mode-locked laser configuration.

In accordance with yet another aspect of the invention, the optical feedback loop includes at least one polarization controller for selectively adjusting the polarization state of the compensating lasing signal. Moreover, in some embodiments of the invention, a polarization sensitive isolator is coupled upstream, with respect to the lasing signal, from the polarization controller. A second polarization controller may also be provided for further adjusting the polarization state of the compensating lasing signal.

In accordance with another aspect of the invention, the optical feedback loop includes a modulator for generating the pulsed signal. The modulator may be an intensity or phase modulator.

In accordance with another aspect of the invention, a method of amplifying an optical signal begins by directing the optical signal to the input of a rare-earth doped fiber, which undergoes optical pumping. A compensating lasing signal is generated at a wavelength different from the wavelength of the optical signal. The compensating lasing signal is a pulsed signal that is directed to the input of the rare-earth doped fiber to provide optical feedback.

DETAILED DESCRIPTION

Figure 1:
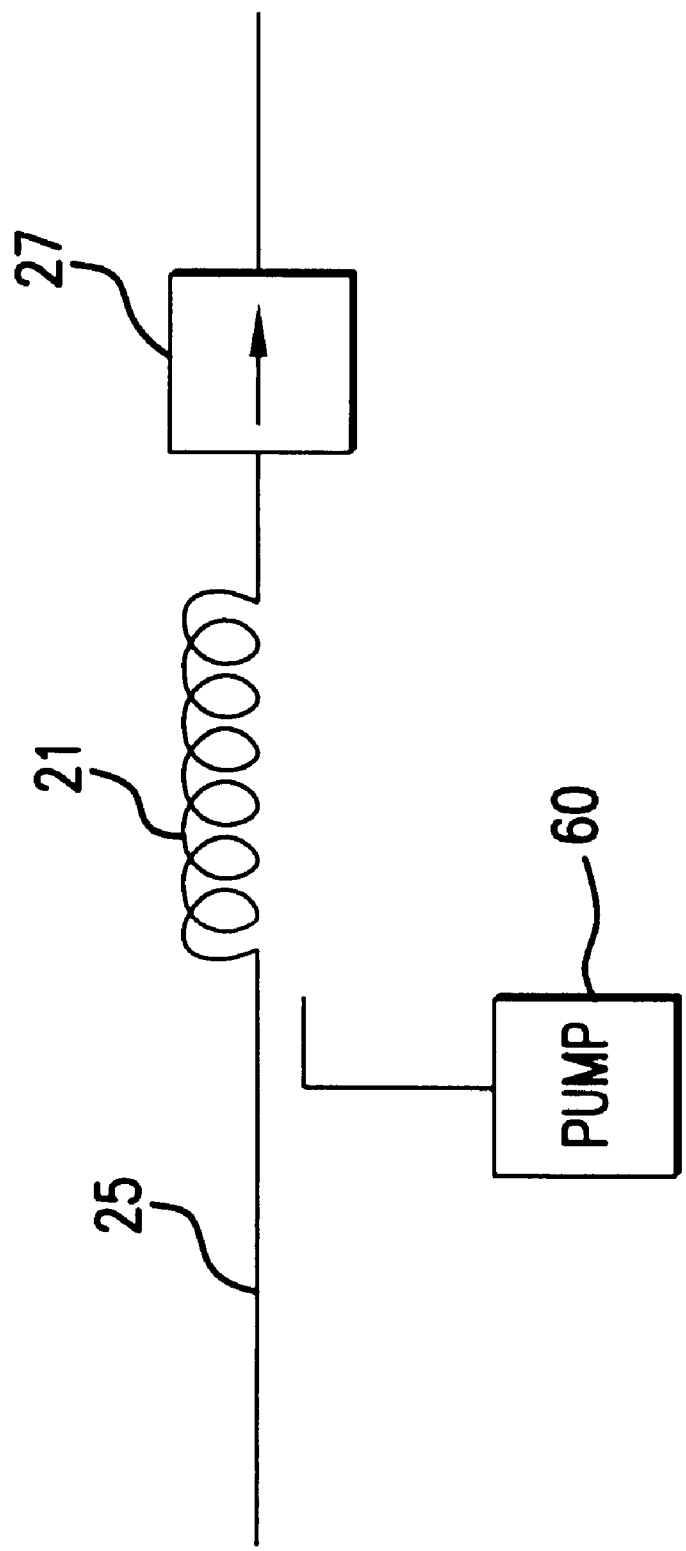
FIG. 1 shows a conventional rare-earth doped optical amplifier.

Referring to FIG. 1, a conventional rare-earth doped optical amplifier includes a rare-earth doped optical fiber 21, such as an erbium doped fiber (EDF), coupled to a source of optical pump energy 60 via a coupler 25 such as a wavelength division multiplexer (WDM). A polarization-insensitive optical isolator 27 is typically located immediately downstream from each of the doped fibers. The isolator prevents amplified spontaneous emission, reflections, and Rayleigh backscattering from traveling back upstream and disrupting system stability by causing the amplifiers to oscillate. Optical amplifiers of this type may be used, for example, in optical transmission systems. In an undersea communication system, for instance, a pair of such optical amplifiers supporting opposite-traveling signals is housed in a single unit known as a repeater.

As previously mentioned, one important consideration in the design of WDM optical communication systems is the degree of gain stabilization provided by the EDFA's in order to reduce power transients or excursions caused by the EDFA cross-saturation effect. For example, when the individual WDM channels of a system are randomly turned on and off (such as in adding or dropping a channel) the gain of the EDFA's may undergo undesirable fluctuations due to saturation effects. Gain clamped EDFA's have been developed to stabilize the gain in such cases.

Figure 2:
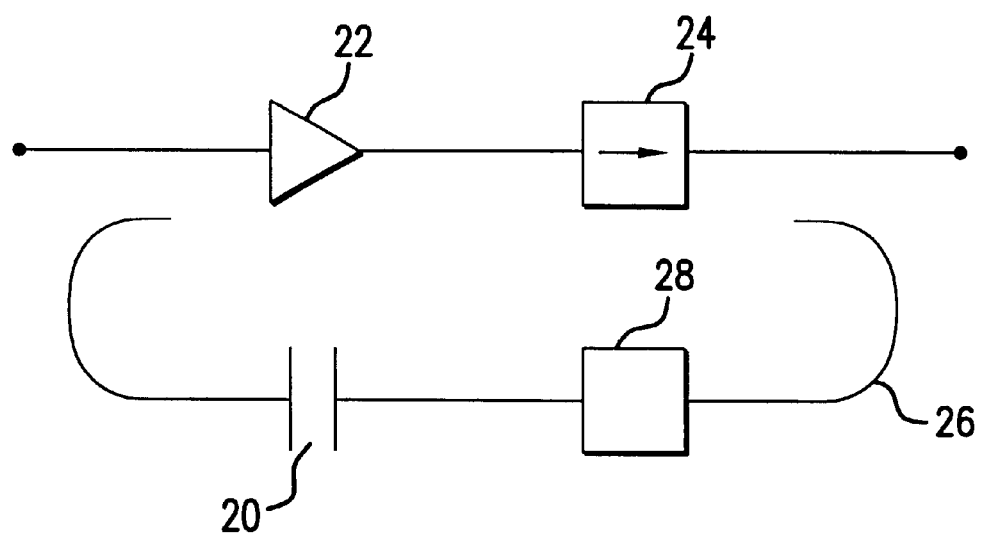
FIG. 2 shows a conventional gain-clamped EDFA.

FIG. 2 shows an example of a conventional gain clamped EDFA. As shown, the gain clamped EDFA employs and EDFA 22 such as shown in FIG. 1. This gain clamped EDFA differs from the EDFA depicted in FIG. 1 primarily in that the gain clamped EDFA employs an optical feedback loop 26 that returns a part of the optical output from a point downstream of isolator 24 to the input of the EDFA 22. That is, the EDFA is arranged in a ring-laser configuration. The feedback loop 26 includes a variable attenuator 28 and a filter 20 to control the lasing conditions. It has been shown that the gain of a WDM signal at any given wavelength, other than the lasing wavelength of the ring-laser configuration, is independent of the total input power of the WDM signal. In other words, the gain-clamped EDFA shown in FIG. 2 provides a constant gain at all signal wavelengths, provided that the signal wavelengths do not include the lasing wavelength.

One problem with the conventional gain clamped EDFA arises when most of the channels are dropped, which can cause the compensating signal in the feedback loop to reach very high power levels. As a result of the high power levels, the compensating signal may experience nonlinear interactions with the transmission medium, e.g., optical fiber, which lead to system degradation. For example, the compensating signal may undergo stimulated Brillion scattering (SBS), which can reverse the propagation direction of the signal and change its frequency.

Since SBS increases with increasing power levels, it follows that if the bandwidth of a given signal is increased, SBS decreases. Accordingly, if the bandwidth of the compensating signal in the feedback loop could be increased, the adverse affects of SBS can be ameliorated. The present inventor has recognized that this result can be achieved by using a pulsed compensating signal rather than a continuous-wave (cw) signal. This approach is effective because the bandwidth of a pulsed signal is greater than the bandwidth of a corresponding cw signal.

The pulsed compensating signal can be generated in the gain-clamped optical amplifier by any desired means. For example, the feedback loop may be configured so that the amplifier device serves as an additive pulse mode-locked fiber ring laser, as described in Tamura et al., "Self-Starting Additive Pulse Mode-locked Erbium Fiber Ring Laser," Electronics Letters, Vol. 28, No. 24, 1992, which is hereby incorporated by reference in its entirety.

Figure 3:
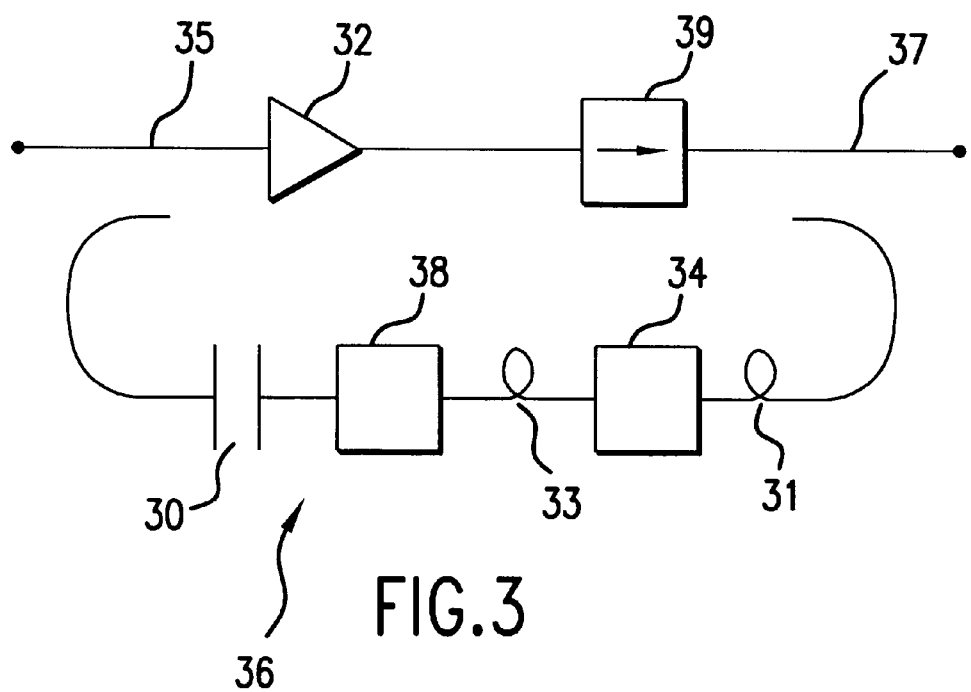
FIG. 3 shows one embodiment of the gain-clamped EDFA constructed in accordance with the present invention.

FIG. 3 shows one embodiment of the inventive gain-clamped EDFA, which employs an additive pulse mode-locked fiber ring laser configuration. As shown, the gain clamped EDFA includes EDFA 32, a polarization-insensitive isolator 39, and optical feedback loop 36, which returns a part of the optical output from the EDFA 32 to the input of EDFA 32 via optical couplers 37 and 35, respectively. Couplers 35 and 37 couple both the laser wavelength and the signal wavelength to the feedback loop 36. The feedback loop 36 includes polarization controllers 31 and 33, polarization-sensitive isolator 34, a variable attenuator 38 and a filter 30 to control the lasing conditions. The I polarization-sensitive isolator 34 serves the dual role of an isolator and a polarizer such that light output by isolator 34 is linearly polarized. The polarization-sensitive isolator 34 is placed between two polarization controllers 31 and 33, which selectively adjust the polarization state of the compensating signal.

The gain-clamped EDFA shown in FIG. 3 operates as follows. Light leaving polarization insensitive isolator 39 is received by the polarization controller 31, which changes the polarization of the compensating signal to an elliptical state. The elliptical polarization state is a superposition of orthogonal linear modes of different intensity, which experience different nonlinear phase shifts through the fiber Kerr medium. Specifically, the polarization state of the compensating signal evolves nonlinearly as it propagates because of self-phase and cross-phase modulation-induced phase shifts imposed on the orthogonally polarized components of the signal. The polarization controller 33 is adjusted such that the polarization-sensitive isolator 34 lets pass the central intense part of the pulse but blocks low-intensity pulse wings. The net result is that the compensating pulse is slightly shortened after one round trip inside the ring cavity, an effect similar to that produced by a fast saturable absorber.

Figure 4:
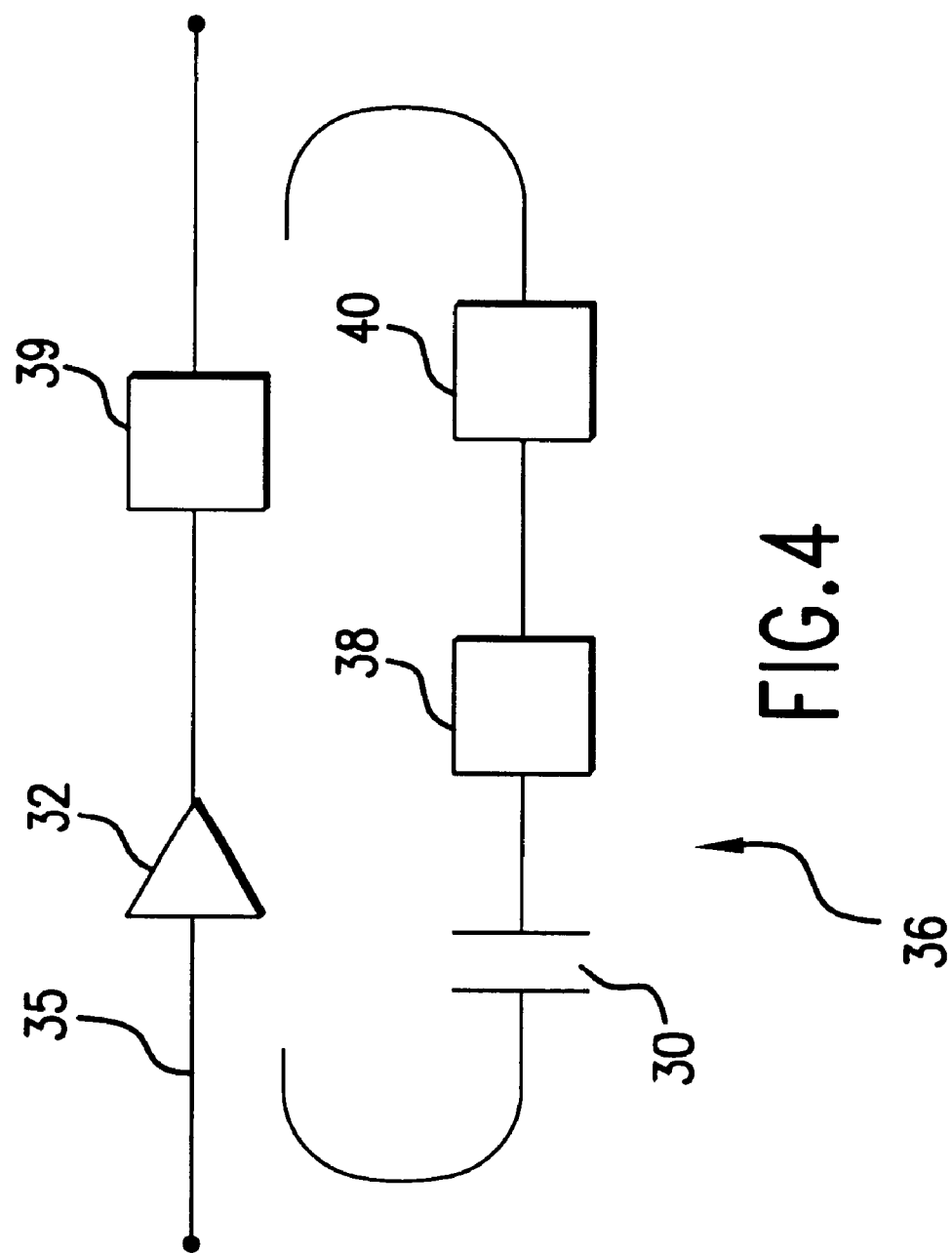
FIG. 4 shows an alternative embodiment of the invention.

FIG. 4 shows an alternative embodiment of the invention in which the pulsed lasing signal is provided by an intensity or phase modulator 40 instead of the polarization controllers shown in FIG. 3. Instead of generating a pulsed signal, the modulator 40 may be used to directly broaden the bandwidth of the lasing signal.

One advantage of the present invention is that in addition to reducing SBS, the present invention also eliminates relaxation oscillation. As is well known, relaxation oscillation arises when the modulation frequency imparted to the signal is comparable to the atomic inversion frequency of the gain medium, e.g., erbium. When the compensating signal is a cw signal, relaxation oscillation results in a substantial performance penalty. When the compensating signal is pulsed in accordance with the present invention, relaxation oscillation can be eliminated so that the gain-clamped EDFA operates in the quantum-limited domain.

The present invention may be advantageously employed in a long-haul optical communication system having a plurality of optical amplifiers. The communication system may be link controlled, in which the gain of all the EDFAs is stabilized by a single gain clamped EDFA. Alternatively, the EDFA's in the communication system may each be a gain clamped EDFA.

Figure 5:
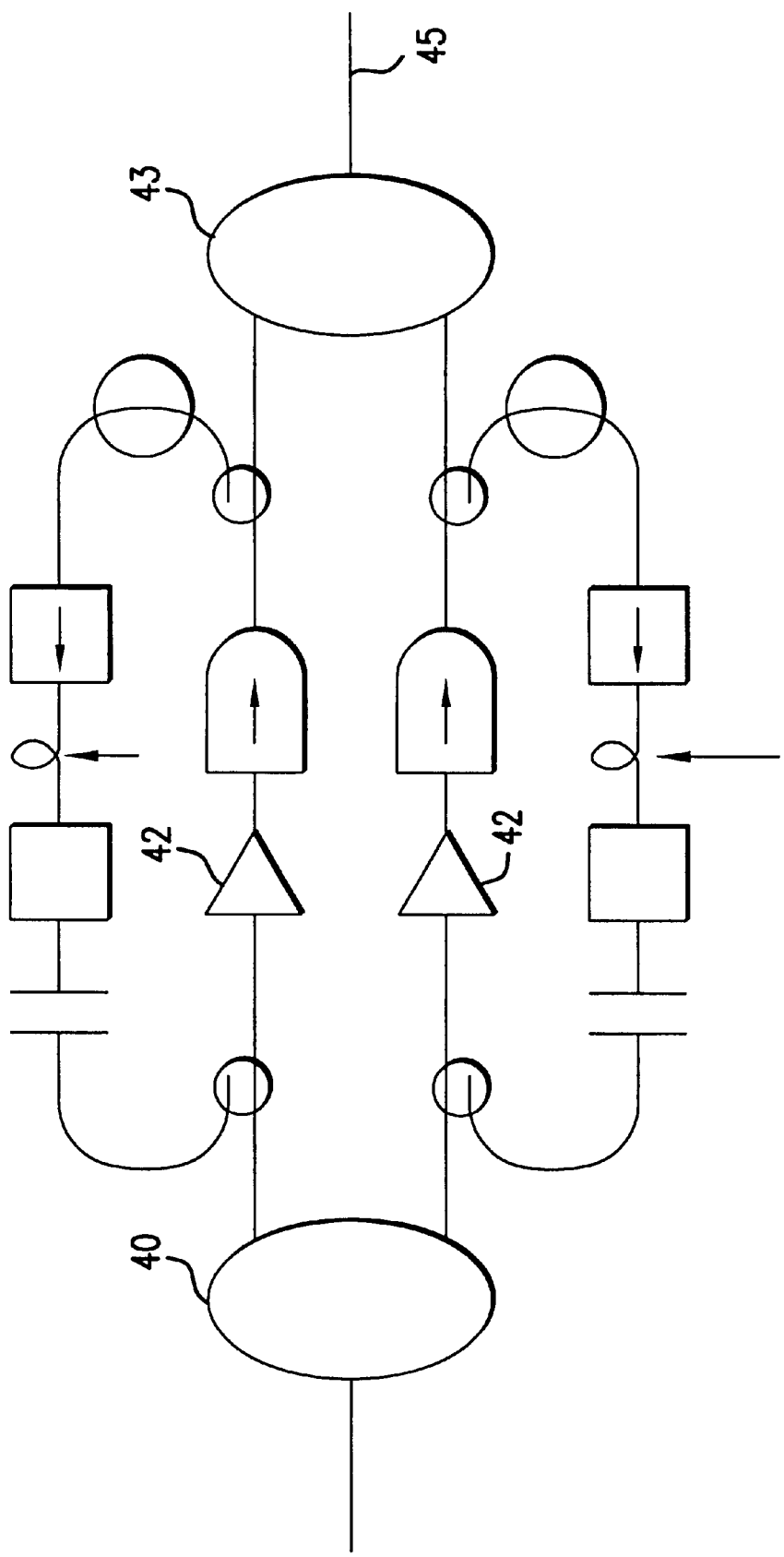
FIG. 5 shows another alternative embodiment of the invention that may be employed to amplify a wavelength division multiplexed optical signal.

Although various embodiments are specifically illustrated and described herein, it will be appreciated that modifications and variations of the present invention are covered by the above teachings and within the purview of the appended claims without departing from the spirit and intended scope of the invention. For example, in a broadband communication system it is sometimes desirable to divide the multiplexed signal into two or more bands and then amplify each band individually with its own optical amplifier optimized for that particular band. FIG. 5 shows an example of such a multiband amplifier arrangement. In operation, the amplifier arrangement first demultiplexes the optical signal traversing the optical transmission path into two or more bands (e.g., the so-called C and L bands encompassing 1525–1565 nm, and 1565–1618 nm, respectively), imparts gain to each band individually, and recombines the bands onto a common path for continued transmission along the transmission path. In FIG. 5, the channels enter a splitter 40 such as a wavelength routing device of the type disclosed in U.S. Pat. Nos. 5,002,350 and 5,412,744 to Dragone, for example. The wavelength routing device 40 divides the incoming multiplexed signal into two output bands which are each directed to respective optical amplifiers $42_1$ and $42_2$. The bands are subsequently recombined in wavelength routing device 43 before exiting the amplifier arrangement on fiber 45. As shown in FIG. 4, each of the EDFAs $42_1$ and $42_2$ may be individually gain clamped in accordance with the present invention. In yet other embodiments of the invention, the erbium doped fiber is segmented into two or more portions, only the first of which is gain clamped with a feedback loop.

What is claimed is:

1. A gain-clamped, rare-earth doped fiber amplifier, comprising:
    a rare-earth doped fiber;
    a source of pump energy coupled to the rare-earth doped fiber;
    a wavelength selective optical feedback loop coupled between input and output ports of the rare-earth doped fiber, said feedback loop supporting a compensating lasing signal at a wavelength different from a signal wavelength, wherein said compensating lasing signal is a pulsed signal.

2. The amplifier of claim 1 wherein said optical feedback loop has an additive-pulse mode-locked laser configuration.

3. The amplifier of claim 2 wherein said optical feedback loop includes at least one polarization controller for selectively adjusting the polarization state of the compensating lasing signal.

4. The amplifier of claim 3 further comprising a polarization sensitive isolator coupled upstream, with respect to the compensating lasing signal, from said polarization controller, said isolator linearly polarizing the compensating lasing signal.

5. The amplifier of claim 3 further comprising a second polarization controller for further adjusting the polarization state of the compensating lasing signal.

6. The amplifier of claim 4 further comprising a second polarization controller for further adjusting the polarization state of the compensating lasing signal.

7. The amplifier of claim 1 wherein said optical feedback loop includes a modulator for generating the pulsed signal.

8. The amplifier of claim 7 wherein said modulator is a phase modulator.

9. The amplifier of claim 7 wherein said modulator is an intensity modulator.

10. The amplifier of claim 1 further comprising:
    a second rare-earth doped fiber;
    a second source of pump energy coupled to the second rare-earth doped fiber;
    a second wavelength selective optical feedback loop coupled between input and output ports of the second rare-earth doped fiber, said second feedback loop supporting a compensating lasing signal at a wavelength different from a signal wavelength, wherein said compensating lasing signal is a pulsed signal; and
    a wavelength-dependent demultiplexer dividing a WDM optical signal into at least two bands, said demultiplexer being coupled to said first and second rare-earth doped fibers for directing said first and second bands to said first and second rare-earth doped fibers, respectively.

11. The amplifier of claim 10 further comprising a wavelength-dependent multiplexer having first and second inputs respectively coupled to the outputs of the first and second rare-earth doped fibers.

12. The amplifier of claim 1 wherein said rare-earth doped optical fiber is doped with erbium.

13. A method of amplifying an optical signal comprising the steps of:
    directing the optical signal to the input of a rare-earth doped fiber;
    optically pumping said rare-earth doped fiber;
    generating a compensating lasing signal at a wavelength different from the wavelength of the optical signal, wherein said compensating lasing signal is a pulsed signal;
    directing the pulsed compensating lasing signal to the input of the rare-earth doped fiber to provide optical feedback.

14. The method of claim 13 wherein said generating step further comprises the step of adjusting the polarization state of the compensating lasing signal to provide the pulsed signal.

15. The method of claim 1 wherein the optical feekback is provided by a feedback loop having an additive-pulse mode-locked laser configuration.

16. The method of claim 2 wherein said feedback loop includes at least one polarization controller for selectively adjusting the polarization state of the compensating lasing signal.

17. The method of claim 16 wherein said feedback loop includes a polarization sensitive isolator coupled upstream, with respect to the lasing signal, from said polarization controller.

18. The method of claim 16 wherein said feedback loop includes a second polarization controller for further adjusting the polarization state of the compensating lasing signal.

19. The method of claim 17 wherein said feedback loop further includes a second polarization controller for further adjusting the polarization state of the compensating lasing signal.

20. The method of claim 15 wherein said feedback loop includes a modulator for generating the pulsed signal.

21. The method of claim 20 wherein said modulator is a phase modulator.

22. The method of claim 20 wherein said modulator is an intensity modulator.

23. The method of claim 13 wherein said optical signal is a WDM optical signal and further comprising the step of dividing the WDM optical signal into at least two bands prior to directing the optical signal to the rare-earth doped fiber method.

24. The method of claim 23 further comprising the steps of directing each of the two bands to different rare-earth doped fibers and subsequent thereto recombining the two bands.

25. A repeater for use in an optical transmission system, comprising: a gain-clamped, rare-earth doped fiber amplifier, including:

a rare-earth doped fiber;

a source of pump energy coupled to the rare-earth doped fiber;

a wavelength selective optical feedback loop coupled between input and output ports of the rare-earth doped fiber, said feedback loop supporting a compensating lasing signal at a wavelength different from a signal wavelength, wherein said compensating lasing signal is a pulsed signal.

26. The repeater of claim 25 wherein said optical feedback loop has an additive-pulse mode-locked laser configuration.

27. The repeater of claim 26 wherein said optical feedback loop includes at least one polarization controller for selectively adjusting the polarization state of the compensating lasing signal.

28. The repeater of claim 27 further comprising a polarization sensitive isolator coupled upstream, with respect to the compensating lasing signal, from said polarization controller, said isolator linearly polarizing the compensating lasing signal.

29. The repeater of claim 27 further comprising a second polarization controller for further adjusting the polarization state of the compensating lasing signal.

30. The repeater of claim 28 further comprising a second polarization controller for further adjusting the polarization state of the compensating lasing signal.

31. The repeater of claim 25 wherein said optical feedback loop includes a modulator for generating the pulsed signal.

32. The repeater of claim 31 wherein said modulator is a phase modulator.

33. The repeater of claim 31 wherein said modulator is an intensity modulator.

34. The repeater of claim 25 further comprising:

a second rare-earth doped fiber;

a second source of pump energy coupled to the second rare-earth doped fiber;

a second wavelength selective optical feedback loop coupled between input and output ports of the second rare-earth doped fiber, said second feedback loop supporting a compensating lasing signal at a wavelength different from a signal wavelength, wherein said compensating lasing signal is a pulsed signal; and a wavelength-dependent demultiplexer dividing a WDM optical signal into at least two bands, said demultiplexer being coupled to said first and second rare-earth doped fibers for directing said first and second bands to said first and second rare-earth doped fibers, respectively.

35. The repeater of claim 34 further comprising a wavelength-dependent multiplexer having first and second inputs respectively coupled to the outputs of the first and second rare-earth doped fibers.

36. The repeater of claim 25 wherein said rare-earth doped optical fiber is doped with erbium.

* * * * *